United States Patent
Hayashi et al.

[11] Patent Number: 5,991,126
[45] Date of Patent: Nov. 23, 1999

[54] PERPENDICULAR MAGNETIC RECORDING AND PERPENDICULAR MAGNETIC REPRODUCING APPARATUS

[75] Inventors: Kazuhiko Hayashi; Kenji Katori; Akihiko Okabe, all of Kanagawa, Japan

[73] Assignee: Sony Corporation, Tokyo, Japan

[21] Appl. No.: 07/960,887

[22] Filed: Oct. 14, 1992

[30] Foreign Application Priority Data

Oct. 22, 1991 [JP] Japan .................................. 3-274235

[51] Int. Cl.$^6$ ............................................ G11B 5/127
[52] U.S. Cl. ............................................................ 360/125
[58] Field of Search .................................... 360/125, 131; 336/177; 428/668, 694, 336; 430/495

[56] References Cited

U.S. PATENT DOCUMENTS

| | | | |
|---|---|---|---|
| 4,745,510 | 5/1988 | Watanabe et al. | 360/131 |
| 4,858,049 | 8/1989 | Kobayashi et al. | 360/126 |
| 4,894,098 | 1/1990 | Otomo et al. | 148/122 |
| 5,147,732 | 9/1992 | Shiroishi et al. | 428/668 |

FOREIGN PATENT DOCUMENTS

| | | |
|---|---|---|
| 0 247 868 | 12/1987 | European Pat. Off. . |
| 61-131228 | 6/1986 | Japan . |
| 1-91314 | 4/1989 | Japan . |
| 1-248312 | 10/1989 | Japan . |
| 2-74012 | 3/1990 | Japan . |
| 3-58316 | 3/1991 | Japan . |

OTHER PUBLICATIONS

Hayashi et al, "CoPtB(0) alloy films as new perpendicular recording media", *J. Appl. Phys.*, vol. 67, No. 9, May 1, 1990, pp. 5175–5177.

Hayashi et al, "Magnetic Properties and Microstructure of Co–Pt–B–O Alloy Films", *Mat. Res. Soc. Symp. Proc.* vol. 232, 1991, pp. 35–46.

Katori et al, "Soft magnetic Fe–Al–N/Si–N multilayered film with higher thermal stability", *Appl. Phys. Lett.*, vol. 54, No. 12, Mar. 20, 1989, pp. 1181–1182.

Abstract of Japanese Published Application 61–242310 (Oct. 28, 1986), *Patent Abstracts of Japan*, vol. 11, No. 091 (P558), Mar. 23, 1987.

Abstract of Japanese Published Application 2–73511 of Mar. 13, 1990, *Patent Abstracts of Japan*, vol. 14, No. 267 (P1058), Jun. 8, 1990.

*Primary Examiner*—Allen T. Cao
*Attorney, Agent, or Firm*—Hill & Simpson

[57] ABSTRACT

The present invention is directed to a perpendicular magnetic recording apparatus and a perpendicular magnetic reproducing apparatus which can achieve high-density recording and high output reproduction. The perpendicular magnetic recording medium (2) is used which has a perpendicular magnetic film made of chiefly Co, Pt and a vertical coercive force of 1500 Oe or above. This recording medium is recorded by the magnetic head (4) of which at least the magnetic gap portion is formed of the soft magnetic thin film (3). This soft magnetic thin film (3) contains chiefly Fe and has a saturation magnetic flux density 4πMs of 19 kG or above.

19 Claims, 7 Drawing Sheets

PERPENDICULAR MAGNETIC RECORDING AND PERPENDICULAR MAGNETIC REPRODUCING APPARATUS

BACKGROUND OF THE INVENTION

1. Field of the Invention

This invention relates to a perpendicular magnetic recording apparatus and a perpendicular magnetic reproducing apparatus.

2. Description of the Related Art

In the field of magnetic recording, perpendicular magnetic recording is advantageous in increasing the recording density and decreasing the wavelength.

Moreover, the perpendicular magnetic recording medium for this perpendicular magnetic recording must have a high coercive force and high residual magnetic flux density. Various researches and developments have been made for the requirements. Some typical perpendicular magnetic recording rigid disks are already proposed of which the perpendicular magnetic recording layers are all made of CoCr alloy.

However, since the saturation magnetic flux density $4\pi Ms$ of this CoCr alloy is as small as 4 to 6 kG (kilogauss), the reproduced output proportional thereto is less than the practical level. Particularly, because of the characteristic of the perpendicular magnetic recording, the reproduced output of a long wavelength ($\lambda > 1$ $\mu$m) range is much less than that of the widely used elongated-type magnetic recording medium.

In addition, although the reproduced output tends to increase with the increase of the coercive force of the CoCr layer, the magnetic head for perpendicular magnetic recording, particularly a single-pole magnetic head, has a low head efficiency. Also, the available soft magnetic core materials for the magnetic head have insufficient saturation magnetic flux densities. Therefore, the endeavor to increase the coercive force of the CoCr layer is not effective.

Of course, the coercive force itself of the CoCr alloy thin film has a limit, or at most 1500 (Oe).

Furthermore, although the index of recording density, $D_{50}$ (the recording density at which the output is halved relative to the long-wavelength output) increases with the increase of the anisotropic magnetic field in the magnetic layer, this index of CoCr alloy is limited to at most 4 to 6 kOe.

The vertical coercive force Hcv of the CoCr-based alloy is 1500 (Oe) as given above when the base on which this alloy is deposited by sputtering or the like is heated to about 150° C., but it is as low as about 300 (Oe) when the base temperature is equal to about the room temperature. The vertical square ratio (Mr/Ms) is about 0.2. In this case, the saturation magnetic flux density Bs is relatively low, and the base temperature for deposition must be kept high in order for the vertical coercive force Hcv to be increased. Therefore, the disk base to be used must have a high heat-resistance. The necessity for high base temperature will incur various industrial disadvantages.

To cope with this problem, the assignee of the present application has previously proposed a CoPt-group-based material, or a CoPt-chiefly-containing perpendicular magnetic film in Japanese Laid-Open Patent Publication Nos. 2-74012, No. 2-74013 and No.2-73510. This CoPt-group-based perpendicular magnetic film has a sufficiently large coercive force Hc even when the film thickness is increased to be large enough. In addition, the disk base temperature thereof is not necessary to be increased upon deposition, and the saturation magnetic flux density Bs is sufficiently large.

However, when the conventional magnetic head is used for recording and reproducing this kind of CoPt-group-based perpendicular magnetic film, high-density recording and high-output reproduction cannot be performed even by making effective use of the characteristics of this film.

OBJECTS AND SUMMARY OF THE INVENTION

Therefore, it is an object of the present invention to provide a perpendicular magnetic recording apparatus and a perpendicular magnetic reproducing apparatus in which the aforesaid shortcomings and disadvantages encountered with the prior art can be eliminated.

More specifically, it is an object of the present invention to provide a perpendicular magnetic recording and a perpendicular magnetic reproducing apparatus which make use of a perpendicular-magnetic recording medium made of CoPt-based or CoPtBC-based alloy in order to achieve high-density recording and high-output reproduction.

According to an aspect of the present invention, there is provided a perpendicular magnetic recording apparatus for recording a perpendicular magnetic recording medium having a perpendicular magnetic film which contains CoPt and of which the vertical coercive force is at least 1500 Oe or above, by use of a record head of which at least the magnetic gap portion is formed of a soft magnetic thin film that has a saturation magnetic flux density, $4\pi Ms$ of at least 19 kG or above and chiefly contains Fe.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Before describing embodiments of the present invention, theory and outline of the present invention will be described in brief hereinafter.

Figure 1:
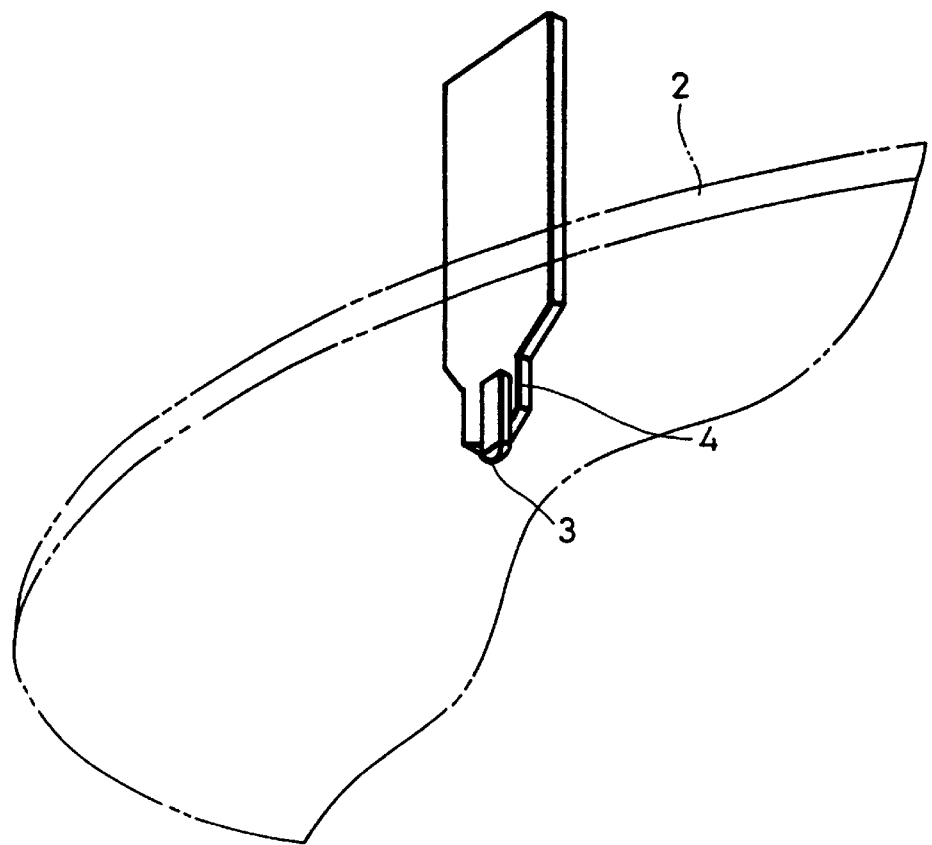
FIG. 1 is a schematic perspective view of one embodiment of the perpendicular magnetic recording apparatus of the invention.
Figure 2:
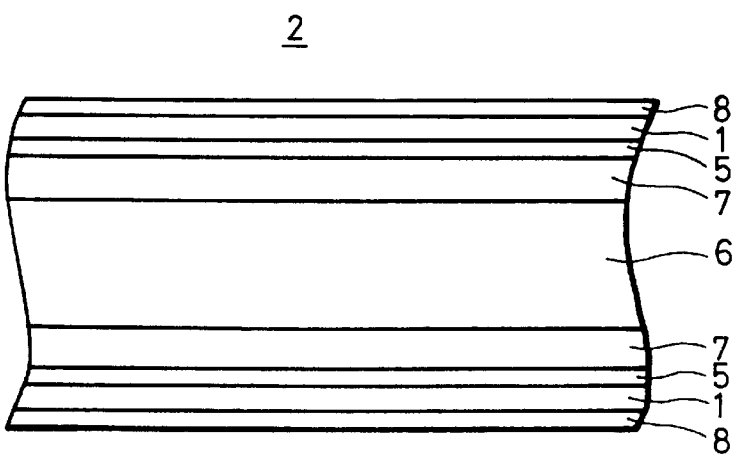
FIG. 2 is a schematic cross-sectional diagram of one example of the perpendicular magnetic recording medium used in the apparatus of the invention.

According to this invention, as shown by a schematic perspective view of a main part of one example of the construction in FIG. 1 and by a cross-sectional view of one example of the magnetic recording medium in FIG. 2, there is provided a perpendicular magnetic recording apparatus for recording a perpendicular magnetic recording medium 2 having a perpendicular magnetic film 1 which chiefly contains CoPt and of which the vertical coercive force, Hcv is 1500 Oe or above, by use of a record head 4 of which at least the magnetic gap portion (the tip of the magnetic pole as to a single-pole structure) is formed of a soft magnetic thin film 3 that has a saturation magnetic flux density, 4πMs of 19 kG or above and chiefly contains Fe.

In addition, according to this invention, the record head 4 is used as a reproduce head, thereby making the perpendicular magnetic recording apparatus be used as a perpendicular magnetic reproducing apparatus.

In addition, according to this invention, the perpendicular magnetic film 1 is formed on an orientation control layer 5 which a nonmagnetic base 6 underlies, thus constituting the perpendicular magnetic recording medium 2.

In addition, according to this invention, the perpendicular magnetic recording medium 2 has the perpendicular magnetic film 1 formed on an auxiliary magnetic film 7 which the nonmagnetic base 6 underlies.

Moreover, according to this invention, the perpendicular magnetic recording medium 2 has the auxiliary magnetic layer 7, the orientation control layer 5, the perpendicular magnetic film 1 and a protective/lubricative layer 8 formed on the nonmagnetic base 6 in the order.

Moreover, according to this invention, the perpendicular magnetic recording medium 2 has the perpendicular magnetic film 1 formed on both sides of the nonmagnetic base 6.

Moreover, according to this invention, the perpendicular magnetic recording medium 2 is a 3.5-inch disk of which one side has a recording capacity of 500 MB (megabits) or above.

Also, according to this invention, the perpendicular magnetic film 1 of the perpendicular magnetic recording medium 2 is made of a CoPtBO-based alloy thin film or an artificial lattice film of Co and Pt.

Furthermore, according to this invention, the soft magnetic thin film 3 of the magnetic head 4 is made of an Fe-N-based alloy thin film or a multilayer thereof.

According to the apparatus of the invention as described above, since the perpendicular magnetic recording medium 2, which is being used, is formed of the perpendicular magnetic film 1 of CoPt radical having a vertical coercive force, Hcv of at least 1500 Oe or above, and since the magnetic head 4 of which the magnetic gap portion, or single-pole portion is formed of the soft magnetic thin film 3 which has a saturation magnetic density, 4πMs of at least 19 kG or above and chiefly contains Fe, the characteristics of the perpendicular magnetic layer of CoPt radical can be fully utilized, so that the high density recording and high reproduction output can be achieved.

The embodiments of the present invention will now be described with reference to the drawings.

This invention can be applied to the magnetic recording apparatus or magnetic reproducing apparatus which makes use of, for example, the so-called rigid disk type recording media.

FIG. 2 of the accompanying drawings is a schematic cross-sectional diagram of one example of the perpendicular-magnetic recording medium 2, for example, a perpendicular-magnetic rigid disk. The nonmagnetic base 6 is prepared, and the auxiliary magnetic layer 7, the orientation control layer 5, the perpendicular magnetic film 1 and the protective/lubricative layer 8 are sequentially formed on each of both main smooth surfaces of the nonmagnetic base 6 as illustrated.

Alternatively, the disk may be formed as a one-side type, though not shown, in which the auxiliary magnetic layer 7, the orientation control layer 5, the perpendicular magnetic film 1, and the protective/lubricative layer 8 are sequentially formed on one main surface of the nonmagnetic base 6.

The nonmagnetic base 6 may be formed of a rigid disk material such as a glass base, PC (polycarbonate) base or PMMC (poly methyl metha-crylate) base.

The auxiliary magnetic layer 7 may be formed by depositing, for example, NiFe, CoNbZr or CoTaZr which have a high magnetic permeability, or a quasi-hard magnetic material such as FeCo, to a thickness of 0 to 1000 nm by sputtering, evaporation or other techniques.

The orientation control layer 5 is the film for controlling the perpendicular property, or orientation property of the perpendicular magnetic film 1, and it may be formed by depositing, for example, Pt or Pd to a film thickness of 0 to 500 nm by sputtering, evaporation or other techniques.

The perpendicular magnetic film 1 may be formed by depositing a CoPt-group material, for example, CoPtB-or CoPtBO-based material or depositing ultra-thin films of alternate Co and Pt as an artificial lattice film, to a thickness of 10 to 500 nm by evaporation, sputtering or other techniques.

In other words, this perpendicular magnetic film 1 has a composition of, for example, $(Co_a Pt_b B_c)_{100-x} O_x$, (a, b, c, x in atomic %)

a+b+c=100

0≦b≦50

0.1≦c≦30

0≦x≦15

This film may have another composition of $[Co_a Pt_b B_c M^1_d]_{100-x} O_x$, (a, b, c, d, x in atomic %)

a+b+c+d=100

0≦b≦50

0.1≦c≦30

0≦d≦30, 0≦x≦15

($M^1$ is Ti, Zr, V, Cr, Nb, Mo, Ta, W, Fe, Ni, Si, Al, Ge, Ga, In, Sn, Pb, Sb, Bi, P, Se, C, Zn, Cu, Ag, Au, Ru, Pd, Re)

This film may have still another composition of $(Co_a Pt_b M^2_c)_{100-x} O_x$ (a, b, c, x in atomic %)

a+b+c=100

0≦b≦50

0.1≦c≦30

0≦x≦15

($M^2$ is Ti, Zr, V, Cr, Nb, Mo, Ta, W)

The protective/lubricative layer 8 is formed by depositing a combination of, for example, C, $TiO_2$ or $ZrO_2$ and a lubricant to a film thickness of 1 to 50 nm.

The lubricant to be used may be fatty acid or metallic salt thereof, fatty acid amide, fatty acid ester, aliphatic alcohol or alkoxide thereof, aliphatic amine, polyhydric alcohol, sorbitan ester, mannitan ester, sulfur fatty acid, fatty acid mercaptan, denatured silicone oil, perfluoroalkylethylene oxide, perfluoropolyether and similar materials, higher alkylsulfonic acid or metallic salt thereof, perfluoroalkylsulfonic acid or ammonium salt or metallic salt thereof, perfluoroalic acid or carboxylate or metallic salt thereof, perfluoroalkylcarboxylic ester, perfluoroalkyl carboxylate or the like. In addition, in order to cope with more stringent working conditions and to maintain the lubricative effect, an extreme-pressure additive may be mixed in the above-given poly (N-perfluoroalkyl carbamoyl) derivative at a weight ratio of about 30:70 to 70:30.

This extreme-pressure additive, when made in partial contact with metal in the boundary lubricative region, generates friction heat to react with the metal surface, producing a reactive product film for preventing friction and abrasion. The known extreme-pressure additives include phosphorus-based extreme-pressure additives such as phosphoric ester, phosphite and phosphoric acid amine salt, sulfur-based extreme-pressure additives such as fat and oil sulfide, monosulfide, and polysulfide, halogen-based extreme-pressure additives such as iodine compound, bromine compound and chlorine compound, organometallic extreme-pressure additives such as thiophosphate, thiocarbamate salt and metal alkyldithiocarbamate, and composite-type extreme-pressure additives such as dialkylthiophosphoric acid amine salt, thiophosphate and thiophosphite.

In addition to the above-given lubricants and extreme-pressure additives, a rust inhibiting agent may be used, if necessary.

The rust preventing agents which can be used may be any materials that are usually used as this kind of rust inhibiting agent for magnetic recording media. These agents include phenol such as dihydric phenol, alkylphenol and nitrosophenol, naphthol such as pure naphthol and nitro, nitroso, amino or halogeno substituted naphthol, quinone such as methylquinone, hydroxyquinone, aminoquinone, nitroquinone and hologenquinone, diallylketone such as benzophenone and derivatives thereof, or hydroxybenzophenone and aminobenzophenone, heterocyclic compounds containing nitrogen atoms such as acridine, 4-quinolinol, quinolinic acid and riboflavin, heterocyclic compounds containing oxygen atoms such as tocophenol and guanosine, heterocyclic compounds containing sulfur atoms such as sulfolane, sulfolene and dithiane, compounds containing mercapto groups such as thiophenol, dithizone and thiooxine, thiocarboxylic acid or thiocarboxylate such as ethanethioic acid or rubeanic acid, and thiazole-based compounds such as diazosulfide and benzothiazoline. Although each of the above-given rust preventing agents may be mixed with any one of the lubricants, it is more effective that as, for example, shown in FIG. 2, the surface of the ferromagnetic metal film 2 previously formed on the nonmagnetic base 1 is first coated with the above rust preventing agent, and then coated with the lubricant like two separate layers.

Upon recording, the perpendicular magnetic recording medium, or rigid disk of this structure is scanned by the magnetic record head of single-pole type or ring-pole type of which at least the magnetic gap portion is made of a soft magnetic material of $4\pi Ms>19$ kG.

The magnetic reproduce head may be a single-pole or ring-type magnetic record head which can serve both as a record head and as a reproduce head or may be a reproduce head of magnetic resistance type or microwave waveguide type exclusively for reproduction which is capable of reproducing short wavelengths, and which is provided separately from the record head.

The soft magnetic thin film 3 which satisfies the characteristic of $4\pi Ms>19$ kG for use in the magnetic record head may be the magnetic films having high abrasion resistance, Bs of 19 kG or above and the following compositions or constituents (i) to (viii).

(i) $Fe_a Al_b Si_c N_d$ (a, b, c, d in weight %)

a+b+c+d=100

$70 \leq a \leq 95$ $2 \leq b \leq 10$ $3 \leq c \leq 16$ $0.005 \leq d \leq 4$ (ii) $Fe_a Al_b Si_c O_d$ (a, b, c, d in weight %)

a+b+c+d=100

$70 \leq a \leq 95$ $2 \leq b \leq 10$ $4 \leq c \leq 15$ $0.005 \leq d \leq 5$ (iii) $Fe_a Ga_b Si_c$ (a, b, c in atomic ratio)

a+b+c=100

$68 \leq a \leq 84$ $1 \leq b \leq 23$ $9 \leq c \leq 31$

In another composition, at least one of Fe, Ga and Si is replaced by Ru of 8 to 15 atomic %.

(iv) $Fe_x N_y A_z$ (atomic %)

$0.5 \leq y \leq 2.5$ $0.5 \leq z \leq 7.5$

The remaining constituents A is at least one or m ore of Si, Al, Ta, B, Mg, Ca, Sr, Ba, Cr, Mn, Zr, Nb, Ti, Mo, V, W, Hf, Ca, Ge and more than one kind of rare earth.

(v) A multilayer of magnetic films of the composition (iv) and nonmagnetic films.

(vi) A multilayer of nonmagnetic metal films and magnetic metal films of which the constituents are chiefly Fe and other elements, one or more of N, O and C wherein N, $O_x$ is of 0.1 to 5 atomic %, and C is of 0.1 to 15 atomic %.

(vii) A multilayer of main magnetic layers which are formed of crystalline magnetic alloy thin films of pure Fe or chiefly Fe and other constituents such as FeSi, Sendust, FeGaSi, FeAlGe, FeCoSi or FeCoSiAl and of 10 to 10000 Å, preferably 50 to 5000 Å in thickness, and amorphous nonmagnetic alloy thin films of CoZr, CoHf, CoTa, CoNb, NiZr, NiHf, CuZr or CuHf and of 3 to 1000 Å, preferably 5 to 50 Å in thickness.

(viii) A multilayer of main magnetic layers which are formed of amorphous magnetic alloy films of chiefly Co and other elements such as CoZr, CoNbZr, Co-(Nb or Ta)-(Zr or Hf), CoHfPd, CoZrMo, CoZrW, CoZrRe, CoHfMo, CoHfW or CoHfRe and of 50 to 10000 Å in thickness, and intermediate layers of amorphous alloy thin films of CoZr, CoHf, CoTa, CoNb, NiZr, NiHf, CuZr or CuHf and of 3 to 1000 Å, preferably 5 to 50 Å in thickness.

(ix) $(Fe_a M_b)_{100-c-d} N_c O_d$ (a, b, c, d in atomic %)

(M is at least one of Si, Al, Ta, B, Mg, Ca, Sr, Ba, Cr, Mn, Zr, Nb, Ti, Mo, V, W, Hf, Ga, Ge and rare earth)

$0.1 \leq b \leq 5$ a+b=100

$0.5 \leq c \leq 15$ $0.1 \leq b \leq 13$ (X) $(Fe_e M'_f M''_g)_{100-h} N_h$ ( e, f, g, h in atomic %)

($M^I$ is at least one of Al, Ga, Ti and rare earth, and $M^{II}$ is at least one of Nb, Ta, V, Zr and Hf)

$0.1 \leq f \leq 2.5$ $0.1 \leq g \leq 2.5$ e+f+g=100

$0.5 \leq h \leq 15$ (Xi) $(Fe_i\ M'_j\ M''_k)_{100-m-n} N_m\ O_n$ (i, j, k, m, n in atomic %)

($M'$ is at least one of Al, Ga, Ti and rare earth, $M''$ is at least one of Nb, Ta, V, Zr and Hf)

$0.1 \leq j \leq 2.5$ $0.1 \leq k \leq 2.5$ $i+j+k=100$ $0.5 \leq m \leq 15$ $0.1 \leq n \leq 13$ (Xii) One which contains CoZr mainly and 0.09–10 atomic % of N.

(Xiii) $(Fe_a\ M_b\ Ni_c)_d\ N_e\ O_f$ (a, b, c, d, e, f in atomic %)

(M is at least one of Si, Al, Ta, B, Mg, Ca, Sr, Ba, Cr, Mn, Zr, Nb, Ti, Mo, V, W, Hf, Ga, Ge and rare earth)

$0.1 \leq b \leq 5$ $0.5 \leq c \leq 10$ $a+b+c=100$ $0.5 \leq e \leq 15$ $0.1 \leq f \leq 13$ $d=100-e-f$ Preferably, Fe-N-based alloy thin films or a multilayer thereof, of which the $4\pi Ms$ of 19 kG or above, or 20 kG can be obtained with ease.

Figure 3:
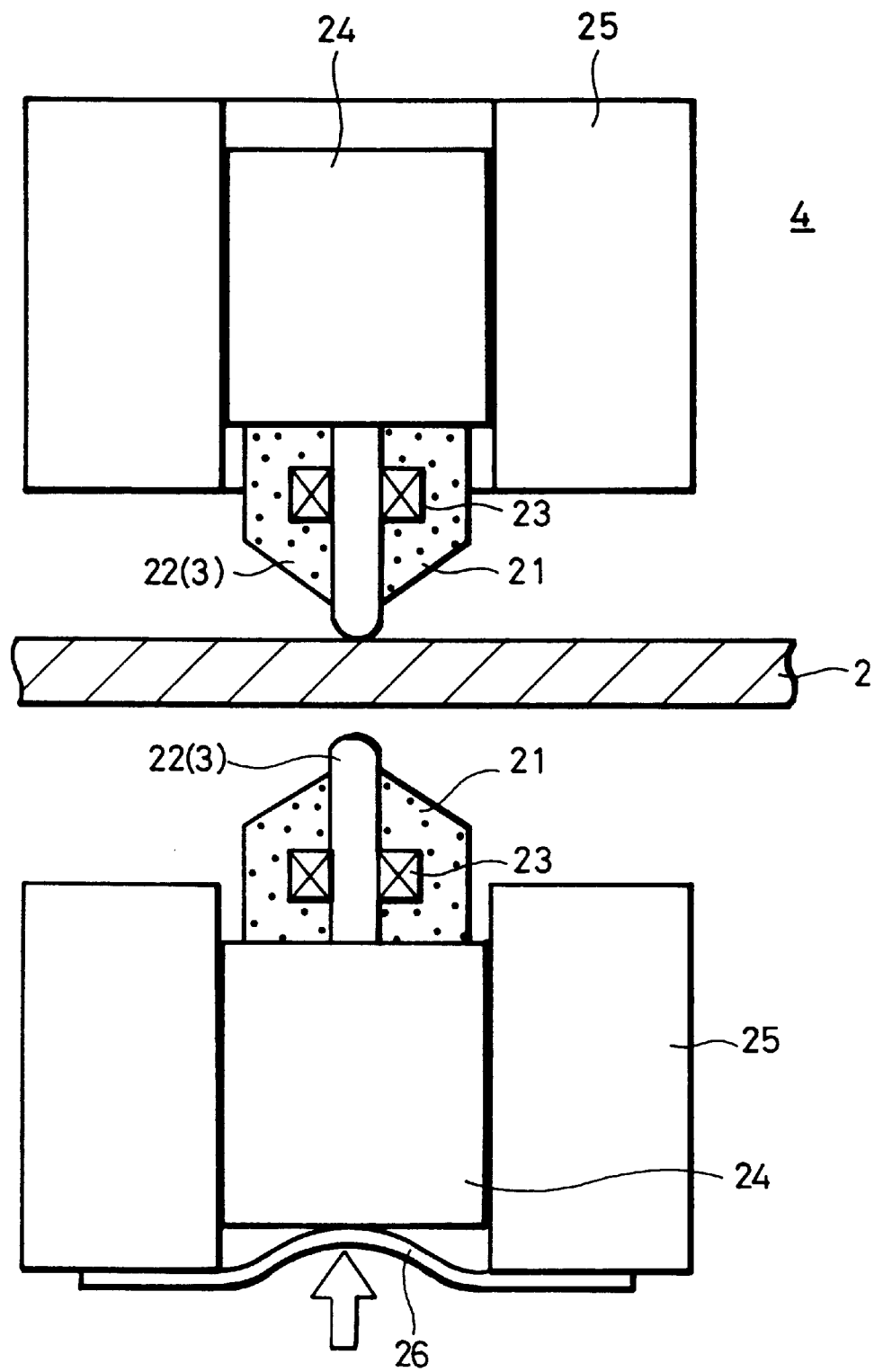
FIG. 3 is a schematic side view of one example of the magnetic head used in the apparatus of the invention.

The magnetic record head may take, for example, a non-floated single-pole perpendicular magnetic head structure. FIG. 3 of the accompanying drawings is a schematic side view of one example of this structure. In this case, the soft magnetic thin film 3 can be deposited as a main magnetic pole 22 on a chip substrate 21 made of an insulating material, for example, ceramic or can be sandwiched between a pair of chip substrates 21. Then, a head winding 23 of a thin film coil, wire or the like is provided around this main magnetic pole 22.

The chip substrate 21 having the main magnetic pole 22 is mounted on a core chip 24 of ferrite or the like. This core chip with the chip substrate is mounted on a head arm 25 so as to be guided to move up and down. Thus, the chip substrate falls by its weight including the weight of the core chip 24 so that its main magnetic pole 22 can be made in pressed contact with the perpendicular recording medium 2, or rigid disk (hard disk) with a necessary pressure.

When the rigid disk magnetic recording medium 2 takes the both-side structure as described with reference to FIG. 2, the same single-pole magnetic head 4 is also disposed under the disk and pushed up to the rear side of the medium 2 with a necessary pressure by a spring mechanism 26 or the like so that it can be made in pressed contact with the disk 2 with a necessary pressure as shown in FIG. 3.

Figure 4:
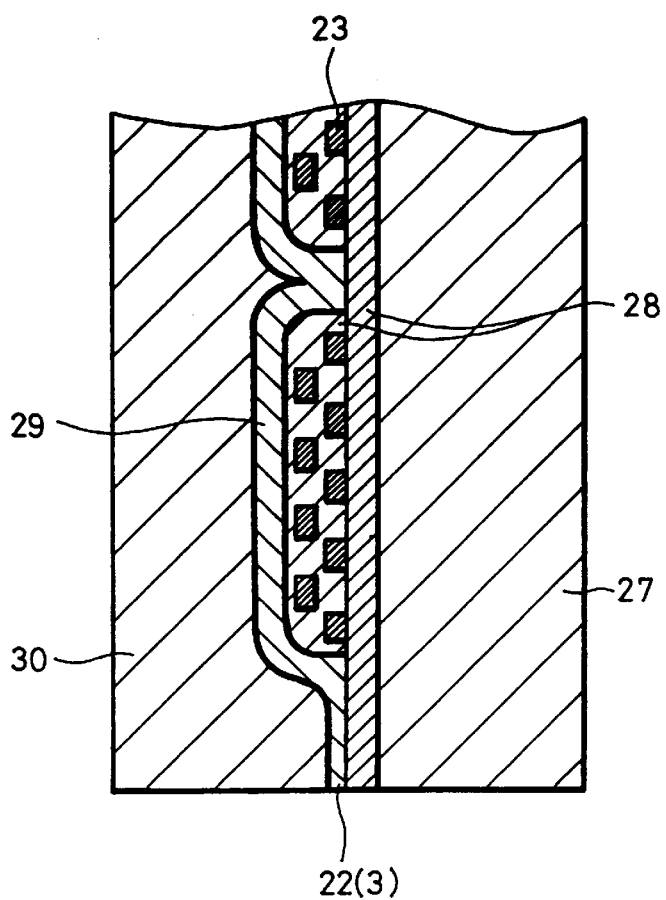
FIG. 4 is a cross-sectional diagram of another example of the magnetic head.

FIG. 4 of the accompanying drawings is a schematic cross-sectional view of another single-pole magnetic disk. As illustrated, the head winding 23 of a thin film coil is deposited by the thin-film or thick-film technology on an insulating layer 28 of $Al_2O_3$ or the like which an auxiliary magnetic pole 27 of Ni-Zn ferrite or the like underlies. Then, a magnetic material for a magnetic yoke 29 is deposited on the insulating layer 28 over the head winding. In addition, the main magnetic pole 22 of the soft magnetic thin film 3 mentioned above is deposited at the tip end of the yoke. Shown at 30 is a protective layer which is formed over the main magnetic pole 22 and the magnetic yoke 29.

Figure 5:
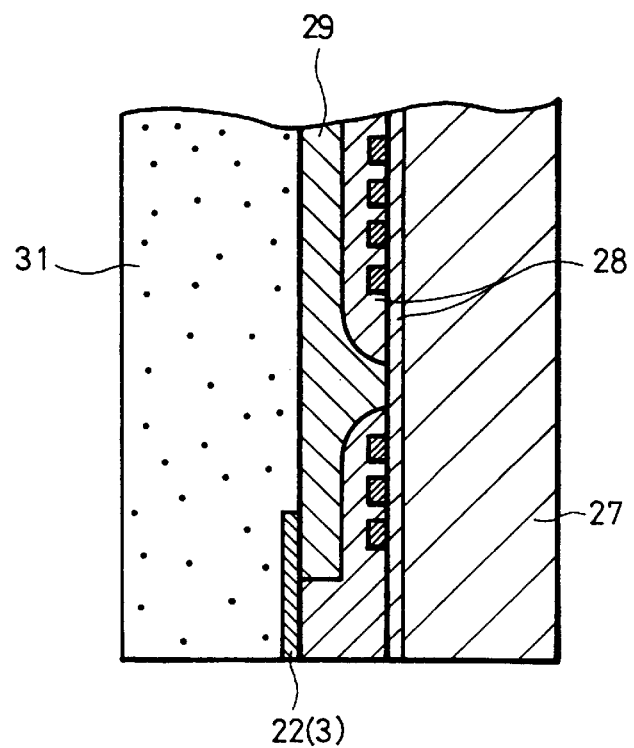
FIG. 5 is a cross-sectional diagram of another example of the magnetic head.

FIG. 5 of the accompanying drawings shows still another single-pole magnetic head. As illustrated, the head winding of a thin film coil is deposited on, for example, the insulating layer 28 which the auxiliary magnetic pole 27 of ferrite or the like underlies. Then, the magnetic yoke 29 of a magnetic layer is deposited over the winding. A nonmagnetic substrate 31 of ceramic or the like is provided, and the main magnetic pole 22 of soft magnetic thin film 3 mentioned above is formed on the nonmagnetic substrate 31 so that its single-pole structure can be magnetically coupled to the tip end of the yoke 29.

Figure 6:
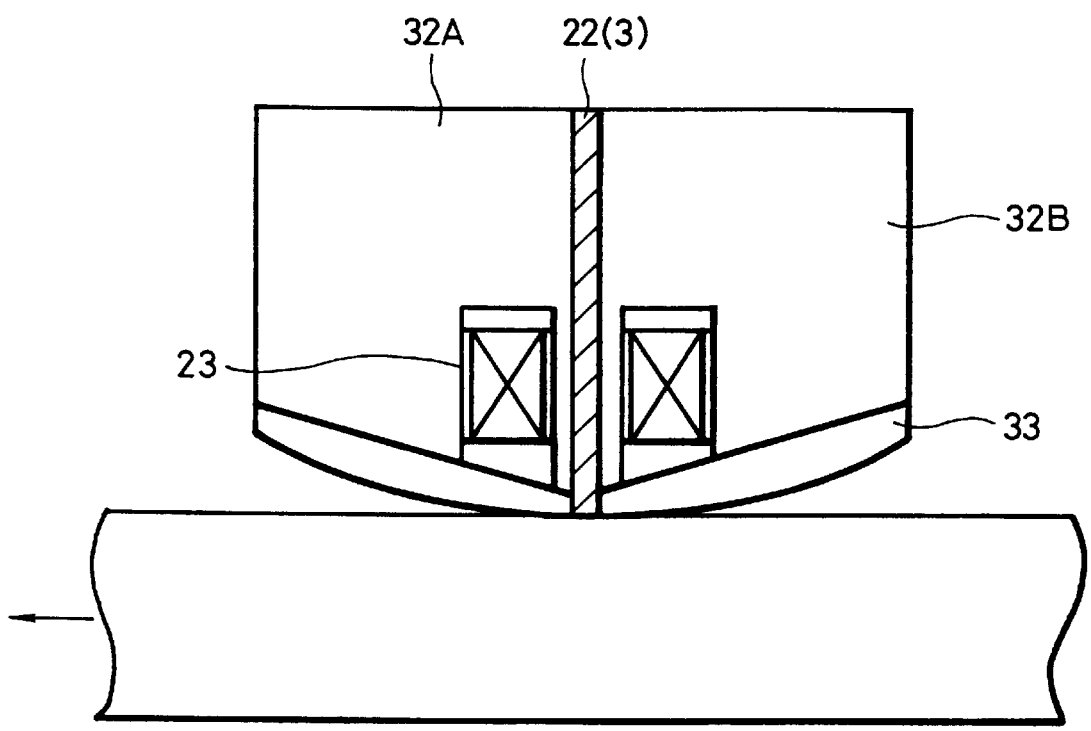
FIG. 6 is a side view of another example of the magnetic head.

FIG. 6 of the accompanying drawings is a side view of a further single-pole magnetic head. As illustrated, nonmagnetic materials 33 each having high abrasion resistance are deposited on the front ends of a pair of magnetic cores 32A and 32B of ferrite or the like so as to be formed as the surface which is made in contact with the medium. The main magnetic pole 22 of soft magnetic thin film 3 is deposited on, for example, one of the cores. Then, the cores 32A and 32B are both attached face to face so that the main magnetic pole 22 is interposed between the cores 32A and 32B. In this case, the head winding 23 is wound around the main magnetic pole 22.

Figure 7:
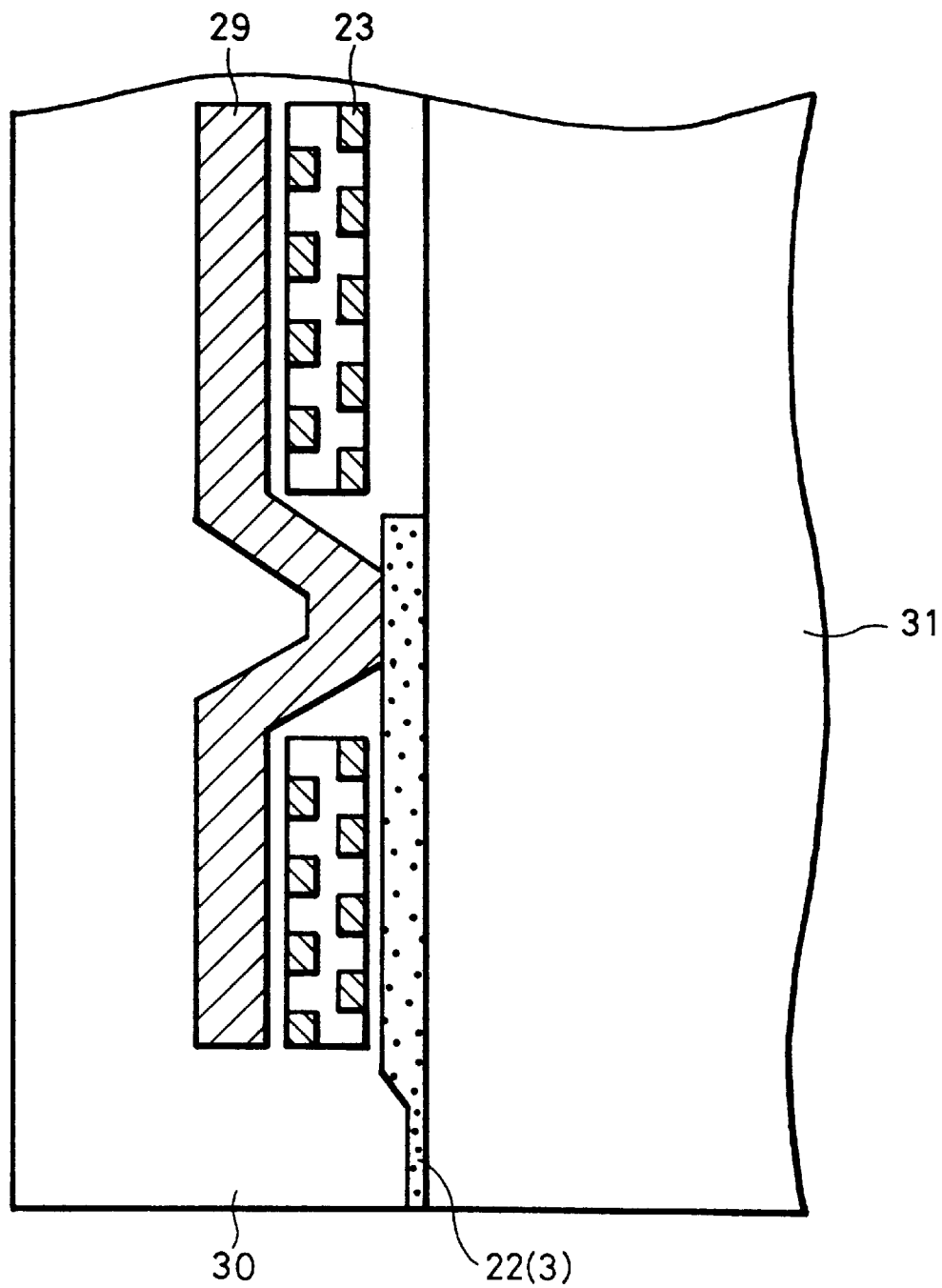
FIG. 7 is a cross-sectional diagram of another example of the magnetic head.

FIG. 7 of the accompanying drawings shows a still further single-pole magnetic head. As illustrated, the soft magnetic thin film 3 of a necessary thickness is deposited on the nonmagnetic substrate 31 of, for example, ceramic, and further the same soft magnetic thin film or another soft magnetic film is deposited to form a thicker magnetic thin film extending backward from the former soft magnetic film, thus forming the main magnetic pole 22. Then, the head winding 23 of, for example, the thin film coil is deposited on the substrate 31 in the same way as mentioned with reference to FIG. 4. In addition, at the center of the winding, the magnetic yoke 29 of NiFe or the like is deposited to be magnetically coupled with the main magnetic pole 22, and covered with the protective film 30.

Figure 8:
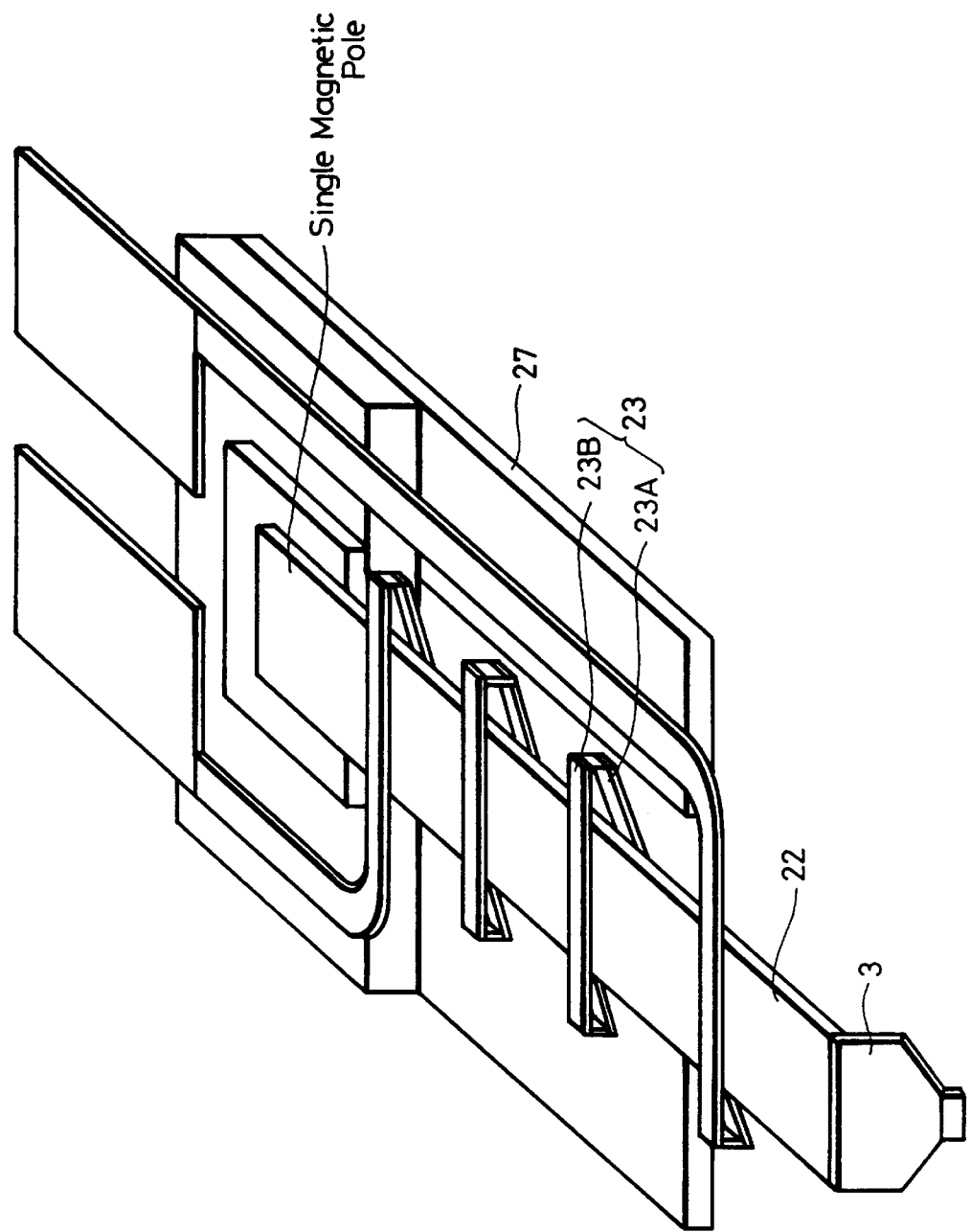
FIG. 8 is a perspective view of another example of the magnetic head.

FIG. 8 of the accompanying drawings shows another structure. As illustrated, the magnetic layer of the auxiliary magnetic pole 27 is formed on, for example, the nonmagnetic substrate, and the main magnetic pole 22 of the soft magnetic thin film 3 with the above characteristic is formed at the tip end of the nonmagnetic layer. In addition, the coil patterns 23A and 23B constituting the head winding 23 are formed on the upper and lower surfaces of the main magnetic pole 22.

The above examples of the magnetic head are of the single-pole type. In this case, if the auxiliary magnetic layer 7 having a high magnetic permeability is provided in the perpendicular magnetic recording medium 2, the soft magnetic thin film 3 of the main magnetic pole 22 can effectively apply a recording magnetic field from the tip to the perpendicular magnetic film 1 in the direction perpendicular thereto.

When the perpendicular recording medium 2 has the perpendicular magnetic film 1 provided only on one side, and when the magnetic head 4 is made in contact with or opposed to the side of the perpendicular magnetic film 1, the auxiliary magnetic pole may be provided on the opposite side of the perpendicular recording medium 2 so that the perpendicular recording medium 2 is interposed between the auxiliary magnetic pole and the magnetic head. In this case, the vertical recording magnetic field can be effectively applied to the perpendicular magnetic recording medium 2.

While the magnetic head 4 is of the single-pole type in the above examples, it may be of the ring type.

Embodiment 1

The single-pole magnetic head used is of a multilayer structure of Fe—Al—N/Si—N and has saturation magnetic flux density $4\pi Ms$ of 20 kG. The rigid disk used is formed of the CoPtBo magnetic film 1 which has $4\pi Ms$ of 12 kG, vertical coercive force Hcv of 3 kOe and vertical-anisotropy magnetic field Hk of 150 kOe shown in FIG. 2.

Prior art 1

The single-pole magnetic head used is made of permalloy and has 4πMs=14 kG. The rigid disk used is formed of a CoCr magnetic film which has 4πMs of 6 kG or below, Hcv of 1.5 kOe or below and Hk of 7 kOe or below.

Figure 9:
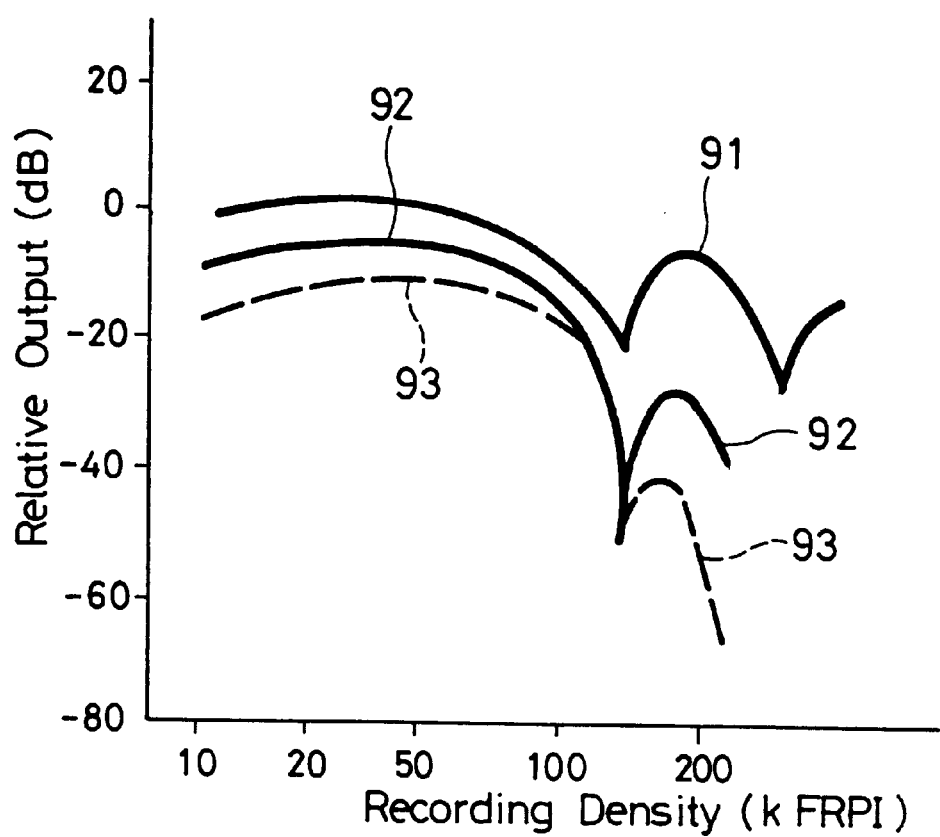
FIG. 9 is a graph of recording density characteristic curves.

The embodiment 1 is improved in the output and recording density over the prior art 1. In FIG. 9, a measured curve 91 shows the relation between the recording density and the output in the embodiment 1. A curve 92 shows the relation of the relative output to the recording density for the use of the same perpendicular magnetic film 1 and the head of 4πMs=14 kG. A curve 93 similarly shows the relation of the relative output to the recording density for the use of the CoCr perpendicular magnetic film and the 14 kG-class single-pole magnetic head. From these curves, it will be seen that the recorder according to this invention can considerably improve the recording density characteristic.

Table 1 shows the relation among the recording density, track width and shortest wavelength in the 3.5-inch disk.

TABLE 1

| Total recording amount | 0.5GB/3.5" | 1GB/3.5" | 5GB/3.5" | 10GB/3.5" |
|---|---|---|---|---|
| Track pitch | 5kTPI | 10kTPI | 10kTPI | 20kTPI |
| Bit pitch | 100kBPI | 100kBPI | 500kBPI | 500kBPI |
| Track width | Tw < 5 μm | Tw < 2 μm | Tw < 2 μm | Tw < 1 μm |
| Shortest-wavelength | λ < 0.5 μm | λ < 0.5 μm | λ < 0.1 μm | λ < 0.1 μm |
| Minimum bit area | 1.3 μm²/bit | 0.51 μm²/bit | 0.11 μm²/bit | 0.051 μm²/bit |

Relation among recording density, track width and shortest wavelength

As described above, the vertical anisotropy magnetic field Hk is improved, and hence the recording density is improved, by use of the magnetic recording medium of the invention, for example, the medium 2 having the CoPtB-O perpendicular magnetic film 1. In addition, although the output can be expected to be increased by the improvement of the saturation magnetic flux density 4πMs and the vertical coercive force Hcv, this invention particularly employs the magnetic record head of which the saturation magnetic flux density Bs is 19 kG or above, thus effectively increasing the efficiency to increase the reproduced output so that the characteristics of the above magnetic recording medium can be effectively utilized.

According to this invention, since the perpendicular magnetic recording medium with a perpendicular magnetic film used has a high vertical coercive force, saturation magnetic flux density and anisotropic magnetic field, and since the magnetic head used has a high saturation magnetic flux density, or 4πMs of 19 kG or above, a high recording density, high efficiency recording and hence high reproduced output can be achieved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A perpendicular magnetic recording apparatus for recording a perpendicular magnetic recording medium having a perpendicular magnetic film which is formed on an auxiliary magnetic layer which is formed on a nonmagnetic substrate, which film contains CoPt and which film has a vertical coercive force of at least 1500 Oe, by use of a record head having a magnetic gap portion being formed of a soft magnetic thin film that has a saturation magnetic flux density 4πMs of at least 19 kG and chiefly contains Fe.

2. The perpendicular magnetic recording apparatus according to claim 1, wherein said record head is used as a magnetic reproduce head, thereby making said perpendicular magnetic recording apparatus be used as a perpendicular magnetic reproducing apparatus.

3. The perpendicular magnetic recording apparatus according to claim 1 or 2, wherein said perpendicular magnetic recording medium has said auxiliary magnetic layer, an orientation control layer, said perpendicular magnetic film and a protective/lubricative layer formed on said nonmagnetic substrate.

4. The perpendicular magnetic recording apparatus according to claim 1, wherein said perpendicular magnetic recording medium has said perpendicular magnetic film formed on both sides of a nonmagnetic substrate.

5. The perpendicular magnetic recording apparatus according to claim 1, wherein said perpendicular magnetic recording medium is a 3.5-inch disc of which one side has a recording capacity of 500 megabits or above.

6. The perpendicular magnetic recording apparatus according to claim 1, wherein said soft magnetic thin film of said magnetic head is formed of at least one layer of an Fe-N-based alloy thin film.

7. The perpendicular magnetic recording apparatus according to claim 1, wherein said perpendicular magnetic film of said perpendicular magnetic recording medium is formed of a CoPtBO-based alloy thin film.

8. A perpendicular magnetic recording apparatus according to claim 1, wherein said perpendicular film is formed of a CoPtBO-based alloy thin film and said soft magnetic thin film of the magnetic head is formed of an Fe-N-based alloy thin film.

9. A perpendicular magnetic recording apparatus according to claim 1, which includes an orientation control layer formed between the nonmagnetic substrate and the perpendicular magnetic film.

10. A perpendicular magnetic recording apparatus for recording a perpendicular magnetic recording medium having a perpendicular magnetic film which is formed of an artificial lattice film of Co and Pt and which has a vertical coercive force of at least 1500 Oe, by use of a record head having a magnetic gap portion being formed of a soft magnetic thin film that has a saturation magnetic flux density of 4πMs of at least 19 kG and chiefly contains Fe.

11. A perpendicular magnetic recording apparatus according to claim 10, wherein said record head is used as a magnetic reproduce head, thereby making said perpendicular magnetic recording apparatus be used as a perpendicular magnetic reproducing apparatus.

12. A perpendicular magnetic recording apparatus according to claim 10, wherein said perpendicular magnetic film is formed on an orientation control layer which is formed on a nonmagnetic substrate.

13. A perpendicular magnetic recording apparatus according to claim 10, wherein said perpendicular magnetic recording medium has said perpendicular magnetic film formed on an auxiliary magnetic layer which is formed on a nonmagnetic substrate.

14. A perpendicular magnetic recording apparatus according to claim 10, wherein said perpendicular magnetic recording medium has an auxiliary magnetic layer, an orientation control layer, said perpendicular magnetic film and a protective/lubricative layer formed on a nonmagnetic substrate.

15. A perpendicular magnetic recording apparatus according to claim 10, wherein said perpendicular magnetic recording medium has said perpendicular magnetic film formed on both sides of a nonmagnetic substrate.

16. A perpendicular magnetic recording apparatus according to claim 10, wherein said perpendicular magnetic recording medium is a 3.5-inch disc of which one side has a recording capacity of 500 megabits or above.

17. A perpendicular magnetic recording apparatus according to claim 10, wherein said soft magnetic thin film of said magnetic head is formed of at least one layer of an Fe-N-based alloy thin film.

18. A perpendicular magnetic recording apparatus according to claim 10, wherein said perpendicular magnetic film of said perpendicular magnetic recording medium is formed of a CoPtBO-based alloy thin film.

19. A perpendicular magnetic recording medium according to claim 10, wherein said perpendicular film is formed of a CoPtBO-based alloy thin film and said soft magnetic thin film of the magnetic head is formed of an Fe-N-based alloy thin film.

* * * * *